Jan. 16, 1951  N. E. WAHLBERG  2,538,344
WINDSHIELD WIPER
Filed Sept. 4, 1944
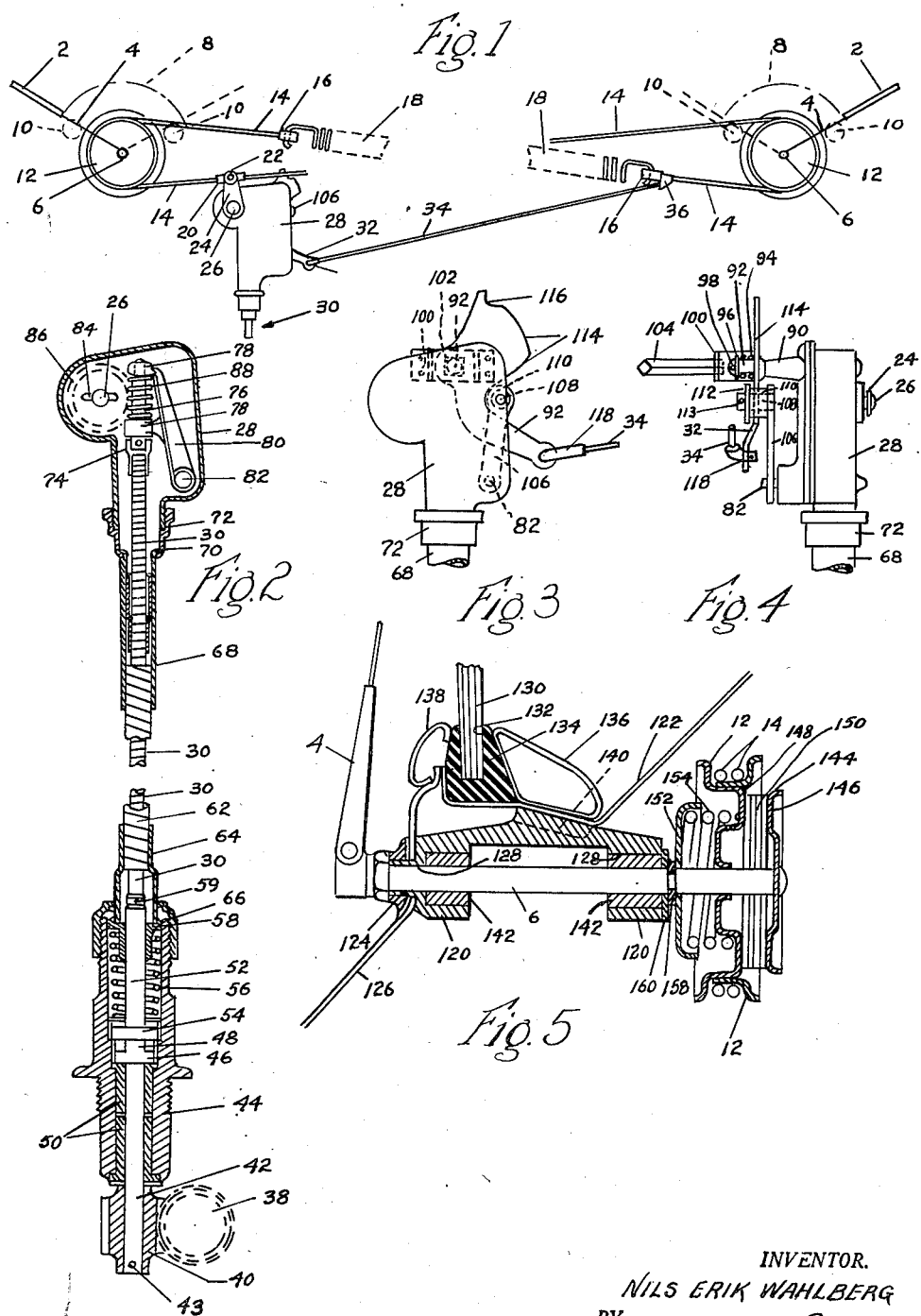
INVENTOR.
NILS ERIK WAHLBERG
BY
his attorney Patented Jan. 16, 1951

2,538,344

UNITED STATES PATENT OFFICE 2,538,344

WINDSHIELD WIPER

Nils Erik Wahlberg, Chicago, Ill., assignor to Nash-Kelvinator Corporation, Kenosha, Wis., a corporation of Maryland Application September 4, 1944, Serial No. 552,628

9 Claims. (Cl. 15—253)

This invention relates to windshield wipers and more particularly to mechanical windshield wipers for automobiles and similar vehicles.

It is an object of this invention to provide a windshield wiper which will be economical and simple to manufacture.

It is another object of this invention to provide a windshield wiper which cannot be broken by manual movement of the wiper blades when the wiper is inoperative.

It is another object of this invention to provide a windshield wiper which is light in weight.

It is a further object of this invention to provide a windshield wiper with a mechanism which automatically returns the wiper blades to correct operating position upon operation of the wiper after they have been manually moved from their proper positions.

It is another object of this invention to provide a windshield wiper which has blades adjacent the windshield and which may be manually moved while the wiper is inoperative.

It is another object of this invention to provide a windshield wiper having a pair of wiper blades which may be manually moved independently of each other.

It is a further object of this invention to provide a windshield wiper with a driving mechanism which will function and not be broken even though one or both blades may be held fast by ice, etc., in one position on the windshield.

Other objects and advantages of this invention will be apparent from a consideration of the following description, claims and the attached drawings, of which there is one sheet, and in which:

Figure 1 is a plan view of a windshield wiper and driving units therefore;

Figure 2 is a side elevation, partially in section, of a portion of the mechanical driving unit;

Figure 3 is a plan view of the gear housing and shifting means mounted thereon;

Figure 4 is another view of the mechanisms shown in Figure 3; and

Figure 5 is a side elevation, partially in section, of the driving mechanism adjacent the windshield and showing means for mounting said driving mechanism and the wipers in operating position.

The automobile industry has long had a perplexing problem as to the matter of providing the automobile with a suitable windshield wiper mechanism.

A common type of windshield wiper driving mechanism is the vacuum wiper. The vacuum type wiper operates from manifold pressure and an increase or decrease in the pressure varies the speed of the wiper, resulting in erratic movement of the wiper blades. Booster pumps are generally provided to partially remedy this defect but manifold pressures are becoming greater in the modern automobile which makes operation of the vacuum wiper nearly altogether dependent on the booster pump. No vacuum wiper has been quite successful.

Wipers driven by electric motors have been used with some success, but the motor has to be of such a size that it is cumbersome, too heavy and much too expensive.

Applicant has invented a mechanical wiper which solves the difficulties encountered with the use of other wiper arrangements.

Referring in detail to the drawings, in which the same reference characters are employed to designate similar parts throughout, Figure 1 represents that portion of applicant's invention which is in the region of the windshield 139 of Figure 5. Shown in Figure 1 is a pair of conventional wiper blades 2 which are carried on the surface of the windshield (not shown in Figure 1) by ordinary wiper arms 4. Arms 4 are mounted on shafts 6 and are rotated about the axis of shafts 6 in arcs designated by dotted lines 8. Stop means 10 determine the extremities of the arcs 8 as they are limits on the rotation of arms 4. Also mounted on shaft 6 are pulleys 12 over which run flexible cables 14. One end of each cable 14 has a connection means 16 thereon with a tension spring 18 interposed therebetween. The other ends of cables 14 are secured together by connection means 20 to form a continuous loop of cables 14 running over pulleys 12, spring 18 being positioned between pulleys 12. In an aperture through connection 20 extends a pin 22 carried on driving crank 24 and crank 24 is securely mounted on a rotatable shaft 26 extending from gear case 28. Extending into gear case 28 is a flexible driving cable 30.

Driving power is transmitted through cable 30 to shaft 26 inside gear case 28 as will be more fully described in connection with Figure 2.

Shaft 26 is rotated about its axis and in so doing, crank 24, pin 22 and connection 20 are also rotated thereabout, alternately pulling one cable 14 and then the other during a complete revolution. Tension spring 18 holds cables 14 firmly on pulleys 12 so that enough friction will be created therebetween to rotate pulleys 12, shaft 6, arms 4 and wiper blades 2. Arms 4 carrying blades 2 will complete arc 8 in a clockwise direction as one cable 14 is actuated and will return through arc 8 in the other direction as the other cable 14 is actuated, thus completing arc 8 in each direction as arm 24 is rotated completely once around the axis of shaft 26.

A single cable 14 may be used with equal facility if one end of spring 18 is secured to connection 20 and its other end to cable 14. The other end of said cable is then connected to connection 20 as shown. Either design may be used as available space, etc., may dictate.

Parking arm 32 is attached to the side of case 28, to which one end of parking cable 34 is attached; the other end of said cable is secured to cable 14 by connection 36. This parking mechanism will be described in more detail in connection with Figure 3.

In Figure 2 is shown the mechanical driving mechanism for the windshield wiper mechanism. Power is taken from the cam shaft 38 of the automobile engine, or other suitable driving means, by a gear 40 which is secured on a driven shaft 42 by a pin 43. The end of shaft 42 opposite gear 40 is encased in housing 44 and defines an outwardly turned flange 46 with a rectangular box-like member 48 thereon. Bearings 50 are positioned in housing 44 around shaft 42. In the upper portion of housing 44 is retained a shaft 52 similar to 42 and having a flange 54 similar to 46 with a groove (not shown) in its lower face adapted to engage member 48 and thus form a driving connection between shaft 42 and shaft 52.

A compression spring 56 is placed around shaft 52 having its one end abutting the top of flange 54 and thus urging shaft 52 downwardly to engage shaft 42. A sleeve 58 is placed around the shaft 52 near its top to hold said shaft in operating position within housing 44 and provide a seat for the upper end of spring 56.

Secured to the top of shaft 52 by a shear pin 59 is a flexible drive cable 30 rotatable within a protective flexible covering 62. Metal sleeve 64 is placed around the lower portion of 62 and is engaged by sleeve nut 66 which is threaded onto housing 44. This forms a rigid aligned juncture between cable 30 and shaft 52.

Cable 30 with its covering 62 extends upwardly into metal sleeve 68 having an outwardly turned flange 70 which is engaged by a sleeve nut 72 threaded onto the bottom of gear case 28. Cable 30 extends into case 28 and is secured by suitable means as at 74 to shaft 76.

Shaft 76 extends through aligned apertures in arms 78 formed and spaced apart on lever 80, which is mounted on and rotates about the axis of shaft 82.

Secured on the portion of shaft 26 within case 28 by pin 84 is a gear 86 which is adapted to mesh with worm gear 88 which is secured on shaft 76 between arms 78 and turned by the power transmitted from cam shaft 38 through cable 30. As lever 80 is rotated clockwise around the axis of shaft 82, worm gear 88 will be moved out of engagement with gear 86 and cable 30 will be pulled upwardly, disengaging the groove in the lower end of shaft 52 and male member 48 of shaft 42, thus leaving only shaft 42 in operation. Counter-clockwise rotation of lever 80 will result in full engagement and operation of these parts.

Lever 80 is rotated about the axis of shaft 82 by manually operated means on the outside of case 28, said means being shown in Figures 3 and 4.

Gear case 28, as shown in Figure 4, has an arm-like appendage 90 in which a shaft 92 is secured and spaced from said case. On shaft 92 is mounted the rotatable shifting arm 32 by means of a compression spring 94 compressed between arm 32 and washer 96, which is held on shaft 92 by a pin 98 in an aperture in the end of said shaft. On arm 32 and forming a bridge over the outer end of shaft 92 is secured a box-like stamping 100 having a square hole 102 (Figure 3) through its upper surface. In hole 102 is positioned a square rod 104 which is manually turned to rotate stamping 100 and arm 32 as desired.

Shaft 82 extends from case 28, having a lever 106 secured on its outer extremity. A pin 108 is secured in an aperture in the opposite end of lever 106, having a rotatable sleeve 110 secured and held thereon by a washer 112 and a pin 113 through said pin 108. Sleeve 110 is positioned to engage and roll over cam surfaces 114 formed on arm 32 and to rest in a semi-locked position in groove 116 (Figure 3) at the upper end of cam surfaces 114.

In an aperture in the end of arm 32 is secured a connection 118 connecting said arm and flexible parking cable 34.

As this mechanism is shown in Figures 1, 2, 3 and 4, it is operating position. If the operator wishes to turn the wiper off, he turns shaft 104 (Figure 4) in a clockwise direction, which will rotate arm 32 in the same direction around the axis of shaft 92. Roller 110 will engage cam surface (lower) 114 and ride thereupon, thus rotating lever 106 and lever 80 (Figure 2) clockwise around the axis of shaft 82. This will disengage worm gear 88 and gear 86, stopping the rotation of shaft 26 (Figures 1 and 2) and driving crank 24 (Figure 1) and thus stop the operation of wiper blades 2. As lever 80 is rotated, it also pulls cable 30, which in turn pulls shaft 52 out of driving engagement with driven shaft 42, thus causing the entire mechanism to become inoperative when not in actual use, with the exception of shaft 42. As shifting arm 32 is manually rotated further, the inoperative wiper blades 2 are moved to parked position by arm 32 pulling cable 34 which in turn pulls cable 14 and moves blades 2 to the position in which they are shown in Figure 1. Cable 34 is of such a length as to be slack while the wiping mechanism is in operation.

Compression spring 56 (Figure 2) exerts the counter force to the above manual disengagement force and tends to maintain the mechanism in operating condition.

The mechanism as described above is a very smooth operating device as first the gears are demeshed, next the shafts are disengaged and then the inoperative wipers are parked. It will be noted from close study of the upper cam surface 114 that when the wipers are turned on, the sleeve 110 will remain in a constant position until it engages lower surface 114, at which time parking cable 34 has been slackened by the rotation of arm 32 enough to permit operation of the wipers; then, shafts 42 and 52 engage and gears 86 and 88 mesh to operate the whole mechanism.

Figure 5 is a detailed view of wiper arm 4, shaft 6 on which it is mounted and pulley 12 over which cable or cables 14 run.

This design embodies the use of a single clutch device to minimize possible wear on cable 14. If pulley 12 were rigidly secured to shaft 6 and a single strand of cable 14 ran over it, compression spring 18 could be chosen strong enough to create sufficient friction between cable 14 and pulley 12 to operate the wipers under normal conditions. But, if the wipers should become frozen solid to the windshield and the driving mechanism was started and allowed to operate, cable 14 would continuously slide over pulley 12, which would eventually cause cable 14 to wear and break.

Applicant has invented the single clutch device shown in Figure 5 which will permit the driving mechanism of Figures 1, 2 and 3 to operate without danger of breakdown or material wearing on vital parts even though wiper blades may be held in a fixed position at all times. Of course, it is neither advisable nor sensible to cause the driving mechanism to function if the wipers are held fast, but applicant has devised this invention as such conditions may often arise through inadvertence or mistake.

The wiping mechanism as shown in Figure 5 is mounted in the usual manner with a bracket 120 secured to the underside of dash panel 122 and having a neck 124 extending through and secured in an aperture in cowl 126. Shaft 6 extends through aligned apertures 128 in bracket 120 and wiper arm 4 is of the conventional type and fastened to the outer end of shaft 6 in the usual manner. Wiper arm 4 carries wiper blade 2 (Figure 1) and holds it against windshield 130, which is carried in groove 132 of rubber molding 134. Molding 134 is bonded to dash panel 122.

Ornamental metal moldings 136 and 138 are secured adjacent strip 134 to reinforce said rubber molding and provide a pleasing appearance. Molding 136 and bracket 120 are secured to dash panel 122 by fastening means 140. Bearings 142 are carried by bracket 120 in apertures 128 and surround shaft 6 to facilitate rotation thereof.

Secured to the end of shaft 6 opposite wiper arm 4 is a clutch-driving device comprising a pulley 12 surrounding shaft 6 and rotatably mounted therearound. Metal disc 144 is secured around the end of shaft 6 and has a raised portion 146 bearing against friction disc 150 which surrounds shaft 6 and is interposed between raised portion 146 and a U-shaped portion 148 of the web of pulley 12. A metal disc 152 surrounds shaft 6 on the side of pulley 12 opposite friction disc 150 and a compression spring 154 is interposed between disc 152 and portion 148 of pulley 12. A washer 158 is secured to shaft 6, limiting the movement of disc 152 along shaft 6. A washer 160 surrounds shaft 6 between bracket 120 and washer 158, thereby spacing the clutch means from said bracket.

Spring 154 constantly urges pulley 12 downwardly along shaft 6 against friction disc 150 which urges said friction disc against metal disc 144, which is rigidly secured to shaft 6. Thus, a friction driving connection is created between pulley 12 and shaft 6.

It will be noted that cable 14 is wrapped around pulley 12 twice which will prevent cable 14 from slipping on pulley 12, thus preventing excess wear of cable 14.

The mechanism as shown in Figures 1, 2 and 3 will function properly without cable 14 being wrapped twice around pulley 12, but, as explained before, if wiper blades 2 were frozen or held in another manner in a fixed position on the windshield and the rest of the mechanism were allowed to operate, the cable 14 would slide over immovable pulley 12 and eventually wear out. Also, when cable 14 (Figure 1) is reciprocated by crank 24 against the pull of spring 18, said spring energizes but as crank 24 rotates further and allows compression spring 18 more freedom by turning toward the direction of pull of said spring, the spring de-energizes cable 14 and there is a reduction of friction between cable 14 and pulley 12. This does not seriously hamper operation of the whole mechanism but the use of the clutch device as shown in Figure 5 removes these two possible sources of mechanical difficulty. If cable 14 is wrapped twice around pulley 12 as in Figure 5, a slight de-energizing of cable 14 by spring 18, Figure 1, will have no bad effect on the connection between cable 14 and pulley 12; and, if blades 2 (Figure 1) are held immovable, pulley 12 and cable 14 may still be operated and all that will be worn is friction disc 150 and the surfaces of 146 and 148 which are adjacent disc 150. This clutch mechanism also permits free manual movement of the blades 2 even though pulley 12 and the remainder of the mechanism is inoperative.

Applicant believes that the invention as described above solves the common problems that have confronted the automobile industry in regard to windshield wipers in that it provides a wiper which cannot be broken by manual movement of the wiper blades when the mechanism is inoperative, the blades may be moved independently, the driving mechanism may operate when the blades are inoperative, the mechanism is light and the invention is simple and economical to manufacture.

While I have described my invention in some detail, I intend this description to be an example only and not a limitation of my invention, to which I make the following claims:

1. In a mechanical windshield wiper driving means, a source of power, a flexible driven cable secured at its one end to a manually controlled clutch-transmission means for transmitting rotating power to said cable, said transmission means comprising a male driving member and a female driven member movable in and out of engagement with said male member, a first gear secured to the other end of said cable and carried by a manually controlled rockable arm, said arm rotatably mounted to move said gear and pull the cable to control the clutch-transmission means, and a shaft on which is mounted a crank and a second gear, said gear positioned so as to be engaged by the first gear.

2. In a mechanical windshield wiper driving mechanism, a source of power, manually controlled transmission means for connecting said source of power to a flexible drive cable, said transmission means having a male drive member and a female driven member movable in and out of engagement with said male member, said cable connected at its one end to a driven shaft of said transmission means and secured at its other end to a worm carried by a rockable arm which is rotatably carried on a shaft to pull said cable along its axis controlling said transmission means, a crank shaft, a crank secured on said shaft, and a gear secured on the shaft designed to be driven by the worm and rotate the crank.

3. In a mechanical windshield wiper mechanism, a source of power, transmission means for connecting said source of power to a flexible drive cable, said transmission means having a male drive member and a female driven member movable in and out of engagement with said male member by said cable, a worm secured to said cable and rotatable thereby, a driven gear mounted on one end of a shaft having a driving crank secured to its other end, and a manually controlled rockable arm carrying the worm in and out of engagement with said driven gear and rotating away from the transmission means pulling the cable to control said transmission means.

4. In a mechanical windshield wiper mechanism, a source of power, a drive shaft rotated by said source of power, a driven shaft, connector parts on said shafts cooperable to form a driving connection therebetween, spring means urging said connector parts into cooperation, a flexible drive cable rigidly secured to said driven shaft and rotatable thereby and extending to transmission means comprising a worm secured to the flexible cable and rotatable thereby, a manually controlled rockable arm by which said worm is rotatably carried, a crank shaft, a gear secured to said crank shaft designed to be engaged by said worm and drive said crank shaft, and a driving crank secured to and rotated by said shaft.

5. A windshield wiper driving mechanism, a pair of gears, one of said gears being movable in and out of engagement with the other, a rockable arm on which the movable gear is carried, a rotatable shaft having said arm secured on its one end and a lever secured on its other end, a pin carried remote from said shaft near the end of the lever, and a manually controlled member having cam surfaces designed to engage said pin and rotate the pin, the shaft, the lever, the rockable arm and the movable gear around the axis of the rotatable shaft.

6. A windshield wiper driving mechanism comprising a driven worm, a shaft, a rockable arm secured to said shaft and carrying said worm, a fixed gear engageable by said worm, a lever on the shaft to rotate said shaft, a pin carried by the lever remote from the shaft, a second lever independently rotatable from the rockable arm and first lever, cam surfaces on said second lever designed to engage the pin of the first lever for rotation of said first lever and its cooperating mechanism, and manual means for rotating the second lever.

7. In a windshield wiping mechanism, power means, a pair of drive shafts, a wiper arm secured on each drive shaft, a wiper blade carried by each wiper arm, a pulley mounted on each drive shaft, flexible cable means wrapped around said pulleys for transmission of rotating force from the power means, a parking means for the wiping mechanism comprising a manually controlled lever, and a flexible cable secured at its one end to said lever and at its other end to the cable means around the pulleys for pulling said cable means in one direction to a parked position when said lever is actuated in one direction.

8. In a windshield wiping mechanism, power means, a drive shaft, a wiper arm carried by said shaft, a wiper blade carried by said arm, a pulley mounted on said drive shaft, a cable means passing over a portion of said pulley for transmission of rotating force thereto from the power means, a parking means for the wiping mechanism comprising a manually controlled lever, and a link extending between said lever and said cable means for pulling said cable means to a parked position in response to the rotation of said lever.

9. In a windshield wiping mechanism, power means, a rotatable shaft, an arm secured to said shaft, a wiper blade carried by said arm, a pulley mounted on said shaft, a cable means passing over said pulley for transmission of rotating force from the power means to said pulley, a parking means for the wiping mechanism comprising a manually controlled lever means, and a link secured to said manually controlled means and to said cable means for pulling said cable means to place said blade in a predetermined position.

NILS ERIK WAHLBERG.

REFERENCES CITED

The following references are of record in the file of this patent:

UNITED STATES PATENTS

| Number | Name | Date |
|---|---|---|
| 293,215 | Baar et al. | Feb. 12, 1884 |
| 774,515 | Geier | Nov. 8, 1904 |
| 924,937 | Richards | June 15, 1909 |
| 1,095,157 | Griffin | Apr. 28, 1914 |
| 1,131,402 | Manson | Mar. 9, 1915 |
| 1,441,009 | Lowenstein | Jan. 2, 1923 |
| 1,464,471 | Getz | Aug. 7, 1923 |
| 1,491,834 | Van Loozen | Apr. 29, 1924 |
| 1,518,473 | Whaler | Dec. 9, 1924 |
| 1,655,670 | Waters | Jan. 10, 1928 |
| 1,747,284 | Berill | Feb. 18, 1930 |
| 1,841,937 | Byrd | Jan. 19, 1932 |
| 2,137,638 | Sayre | Nov. 22, 1938 |
| 2,172,488 | Waters | Sept. 12, 1939 |

FOREIGN PATENTS

| Number | Country | Date |
|---|---|---|
| 610,278 | France | Sept. 2, 1926 |
| 383,900 | Great Britain | Nov. 24, 1932 |
| 422,217 | Great Britain | Jan. 8, 1935 |